United States Patent [19]

Fennema et al.

[11] Patent Number: 5,164,932
[45] Date of Patent: Nov. 17, 1992

[54] ACQUIRING A BEST FOCUS USING A FOCUS SIGNAL OFFSET

[75] Inventors: Alan A. Fennema; Robert A. Klem, both of Tucson, Ariz.

[73] Assignee: International Business Machines Corporation, Armonk, N.Y.

[21] Appl. No.: 589,708

[22] Filed: Sep. 28, 1990

[51] Int. Cl.[5] .............................................. G11B 7/00
[52] U.S. Cl. ............................ 369/44.29; 369/44.27; 369/44.32
[58] Field of Search ............... 369/44.27, 44.28, 44.29, 369/44.31, 95, 44.34, 44.55, 44.36, 44.32; 250/201.5, 201.2

[56] References Cited

U.S. PATENT DOCUMENTS

| | | | |
|---|---|---|---|
| 4,607,157 | 8/1986 | Millar et al. | 369/44.29 |
| 4,733,066 | 3/1988 | Konno et al. | 369/44.29 |
| 5,050,151 | 9/1991 | Kurz | 369/44.29 |
| 5,077,719 | 12/1991 | Yanagi et al. | 369/44.29 |

FOREIGN PATENT DOCUMENTS

| | | |
|---|---|---|
| A30304932 | 3/1989 | European Pat. Off. |
| A20354754 | 2/1990 | European Pat. Off. |
| A20392561 | 10/1990 | European Pat. Off. |

Primary Examiner—Roy N. Envall, Jr.
Assistant Examiner—Nabil Hindi
Attorney, Agent, or Firm—H. F. Somermeyer

[57] ABSTRACT

A focus acquisition system includes providing a focus offset and changing the offset symmetrically for each measurement cycle. The amplitudes of the readback or tracking error signal are sensed and compared. When the amplitudes of the tracking error or readback signal is different at each of the offsets, then a new measurment cycle is performed after calculating a new offset value. The process is repeated until the temporary measurement offsets result in readback amplitudes that are substantially equal. A best focus is then indicated as being a position in which small defocussing will not substantially degrade the quality of the readback signal.

8 Claims, 3 Drawing Sheets

ACQUIRING A BEST FOCUS USING A FOCUS SIGNAL OFFSET

DOCUMENT INCORPORATED BY REFERENCE

Co-pending commonly assigned patent application Ser. No. 07/533,305 filed Jun. 4, 1990 is incorporated by reference.

FIELD OF THE INVENTION

The present invention relates to optical focussing systems, particularly the acquisition of focus in such systems. The present invention is particularly useful for optical disk recorders.

BACKGROUND OF THE INVENTION

Optical disk recorders, in particular, employ objective lenses having very small size and mass. Such lenses are typically moveable along their optical axis for effecting focussing motions. The depth of field of such lenses is typically small such that an in-focus condition must be rather precise for effecting effective recording and readback of signals onto and from an optical disk. Generally, the acquisition of focus of the objective lens, i.e., the movement of the objective lens to an in-focus position, should be reliably and quickly accomplished for preventing retries and other delays in using an optical disk recorder. The initially acquired focus may not be a best focus for use in a particular application. For example, in video recorders, it is known that the amplitude of the video readback signal is used for obtaining a best focus indication. In many optical disk of the data recording type, there is no recorded signal for effecting the calibration of focus to a maximum readback amplitude.

Further, focussing errors in an optical disk drive may result in a spot of focussed light that is larger than desired which produces a smaller amplitude readback signal and less light intensity at the disk during write operations. Such conditions can cause errors in data recording and readback. Offset errors in the focus error signal (FES) may be caused by initial manufacturing tolerances as well as thermal effects. It is desired to eliminate these steady state errors.

Many focus acquisition systems find the peak of the FES signal which is adjacent to a idealized focus condition, as is well known. Finding the peak may require measurement of a large number of points on the FES signal; this action is particularly true when there are minor fluctuations occurring over the range of the FES signal with respect to changing focus conditions. Such an action is time consuming since for each focus offset value an entire rotation of the disk would normally be required for eliminating signal variations due to disk angular positions. Other considerations in focussing systems is that the peak of the FES signal that represents best focus may not be the most desirable operating point. Machine vibration as well as disk runout may produce small errors in the ability of the focussing servo to maintain the idealized in-focus condition. Under some circumstances, a slight defocussing may result in an undesired loss of readback signal amplitude. It is desired to eliminate these problems by a simple focus acquisition system.

DISCUSSION OF THE PRIOR ART

Konno et al. U.S. Pat. No. 4,733,066 shows a typical prior art focus acquisition system in which focus acquisition is acquired during a so-called open loop mode. Then upon detecting an in-focus condition, a focus maintenance servo is actuated for maintaining the focus of the objective lens. Konno et al. also show the typical control signal having a ramp shape for moving the objective lens to the in-focus position. Konno et al. require a resilient means for supporting the focussing lens. Such resilient means is desired to be eliminated.

The document incorporated by reference shows a focus acquisition system using a series of pulses for softly moving a lens toward an in-focus condition. A peak detector is used for detecting a peak of the FES signal for defining the in-focus condition. It is desired to provide a best focus acquisition system which results in a more desirable in-focus condition.

U.S. Pat. No. 4,332,022 (now RE32051) by Ceshkovsky et al. show using the readback signal amplitude as a criterion for determining a best focus condition while using a video signal for indicating a best focus condition, it is desired to provide a more quickly and fossil way of acquiring focus that will maintain a relatively good readback signal amplitude even with slight variations of focus condition.

U.S. Pat. No. 4,707,648 shows a focus acquisition system in which a focus error signal and an offset signal are combined to drive a focus actuator. A plurality of measurements are made for finding a focus condition at which the readback signal has a maximum amplitude. In clear contradistinction to this teaching, the present invention provides for a best focus which is usually not at the maximum amplitude but is at a condition in which slight defocussing will not degrade readback signal amplitude or quality. It has been found that when a maximum amplitude is used for defining a best focus condition, that in a data storing optical disk at such maximum amplitude may have a relatively steep falloff in readback signal amplitude. In this circumstance, a slight defocussing could cause a significant and undesired reduction in readback signal amplitude.

SUMMARY OF THE INVENTION

It is an object of the present invention to provide a best focus acquisition which enables a maximal focus error with minimal changes in readback signal amplitude.

At a near focus condition, either the tracking error signal amplitude or a readback signal amplitude is sampled at spaced positions from the initial approximate in-focus condition. A focus offset control moves the focus condition on both sides of the current in-focus condition. When the TES or readback signal amplitude at the offset positions are equal then a best focus condition is defined.

In a preferred embodiment of the invention, an initial focus is acquired using ramp and peak detection techniques. Once the approximate initial focus position of a lens is determined, then the TES or readback signal is analyzed at the two offset positions from the current focus position for finding a focus condition wherein slight out of focus changes will not substantially reduce the amplitude of the TES or readback signals.

The foregoing and other objects, features and advantages of the invention will be apparent from the following more particular description of preferred embodi-

DETAILED DESCRIPTION OF THE DRAWINGS

Figure 1:
FIG. 1 is a simplified flow chart of machine operations showing the practice of the present invention.

Referring now particularly to the drawing, like numbers indicate like parts, functions, and structural features in the various figures. Referring to FIG. 1, a flow chart for practicing the present invention in its best mode is shown. At machine step 10 an initial focus condition is acquired for the focussing system. Such an initial focussing system may be employed in the document incorporated by reference. At machine-executed step 11, an FES offset signal value is varied to acquire a best focus. A best focus is defined as a focus condition in which a slight defocussing will not significantly change the amplitude of any readback or TES signal. This is in contradistinction to a focus condition made at a maximum amplitude TES or readback signal in which a slight change in the focus condition can cause a relatively rapid degradation of either the TES or the readback signal. Finally at machine step 12 the optical disk drive is operated at the best focus condition determined in step 11.

Figure 2:
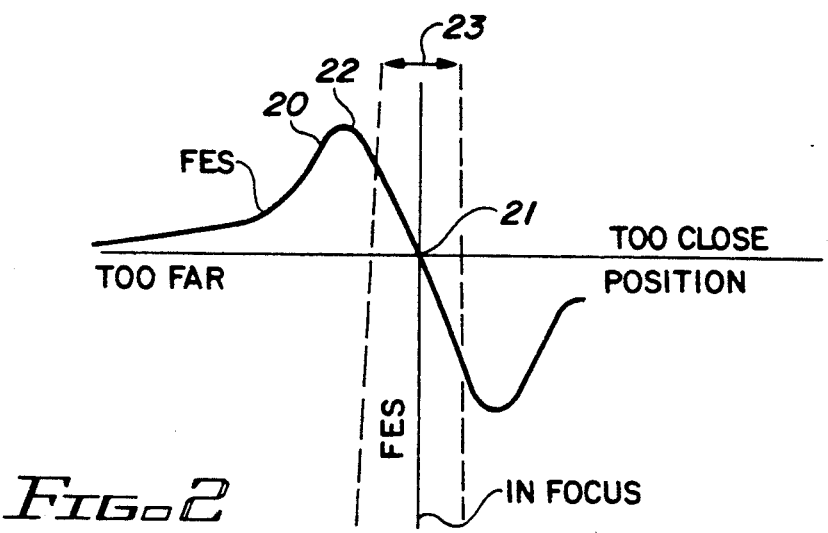
FIG. 2 is a graph illustrating the well-known FES signal characteristics in and around an in-focus condition.
Figure 3:
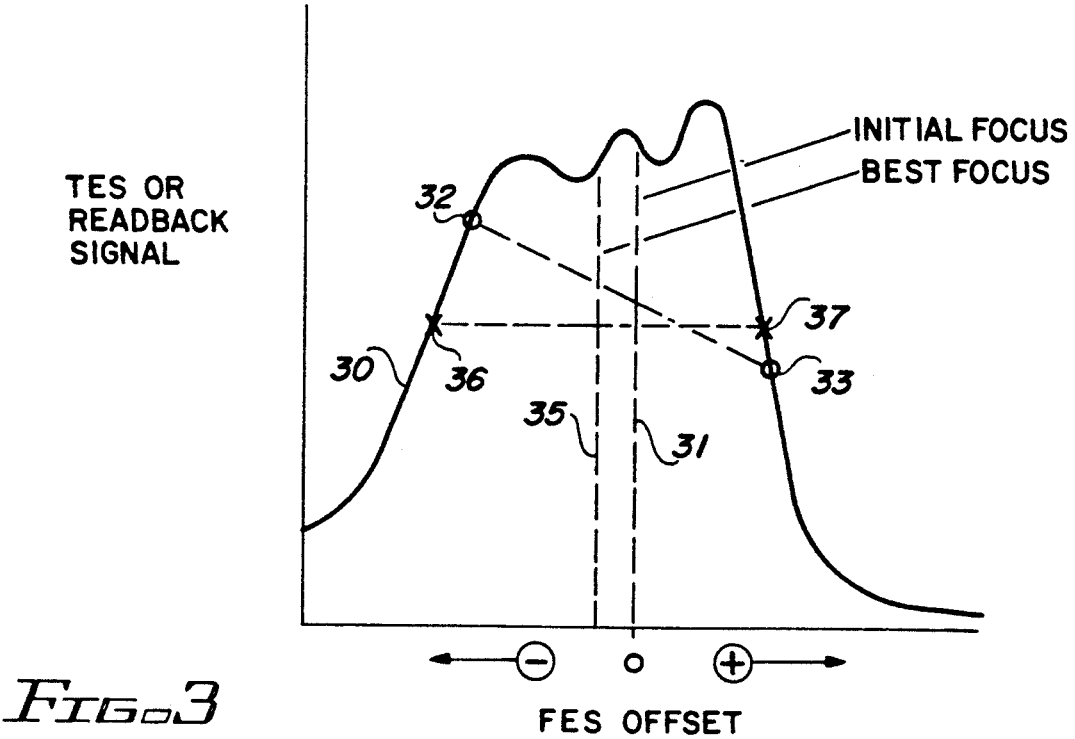
FIG. 3 a graph showing the relationship of FES offset with respect to a tracking error signal (TES) or a readback signal amplitude.

Referring next to FIG. 2 a typically FES curve with relationship to focus condition is shown. The horizontal axis indicates a relative position in the lens with respect to the focus plane, i.e., optical disk. As the distance is varied and the focus condition changes from an in-focus condition at 21 to out-of-focus conditions the FES signal 20 reaches a peak at 22 before it is moved too far away from the focal plane. A similar peak occurs at a too close condition. At machine step 10, the focus condition within the range indicated by double headed arrow 23 is acquired. Focus condition may be actually at the zero axis crossing at 21; but because of device parameters and disk parameters, such a focus condition may not be the best focus condition as defined in machine step 11. Accordingly, a further procedure as described with respect to FIG. 3 is followed for finding a best focus condition. A focus servo is provided as later described with an FES offset input for controlling the focus drive signal to provide a focus condition other than that previously indicated by the FES signal. In FIG. 3 the horizontal ordinate represents the FES offset value with a zero value being at an initial focus condition represented by vertical dashed line 31. Curve 30 represents the TES amplitude or the readback signal amplitude as a function of FES offset from the zero position. According to the invention, from the current FES offset value two measurements are taken. One addition to the offset which is sufficient to cause a defocussing which is on the one slope of the curve 30 while a second offset, a subtractive offset, causes the focus condition to result in a defocus effecting a signal amplitude on the other slope of the curve 30. At an initial focus condition, represented in FIG. 2, the focus offsets resulted in amplitudes from a TES signal represented at 32 and 33. Since the measured value at 32 is much greater than the measured value at 33, the initial focus condition could be too close to one of the slopes causing a relatively large change in TES or readback signal amplitude even though such could be at a maximum readback signal amplitude at the best focus condition. It is desired to provide a best focus in which the readback and TES signal amplitudes are equal at the two FES offset positions such as at 36 and 37 which results in a best focus indicated by vertical dashed line 35. Curve 30 also shows that because of noise and other characteristics the variation in TES or readback signal return will vary such as shown in curve 30. It is to accommodate this variation that the present invention finds its most valuable application.

Figure 4:
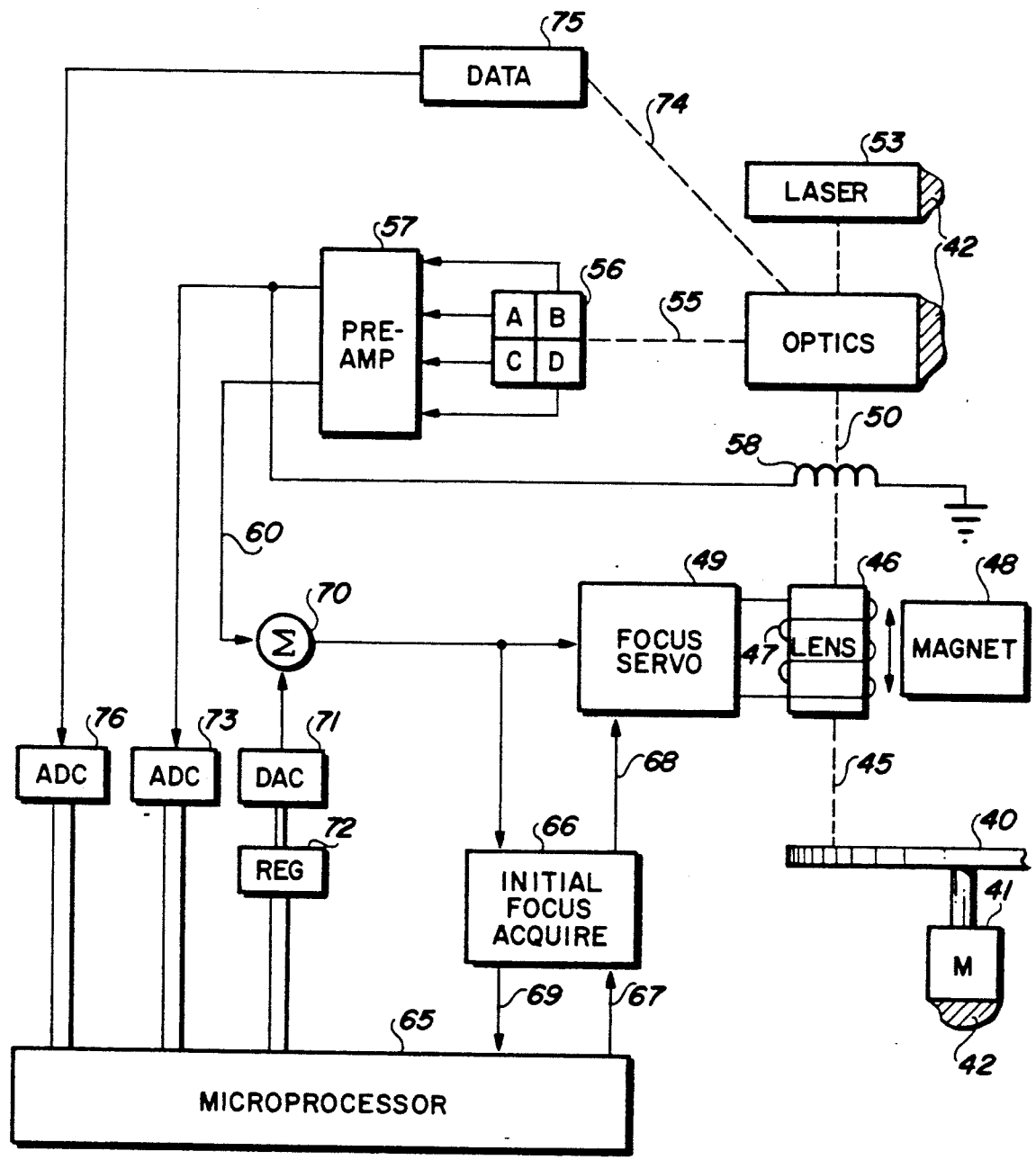
FIG. 4 is a simplified block-diagram of an optical disk recorder in which the invention is incorporated.

Referring next to FIG. 4, the operation of the invention as above-described as implemented in a preferred embodiment is shown. The optical disk player/recorder includes a rotatable magnetooptic disk 40 mounted on a motor 41 which in turn is mounted on a frame 42 of the drive. A laser beam passing through path 45 from lens 46 is reflected by the surface of disk 40 back through lens 46 in a usual manner. A focussing coil 47 fixed on lens 46 cooperates with a permanent magnet 48 mounted on a head carriage (not shown) for moving lens 46 along its optical axis which is substantially coincident with path 45. Focus servo 49 is connected to focussing coil 47 for effecting focus control of lens 46 with respect to disk 40. A laser 53 supplies a laser beam through optics 52 over path 50 to lens 46 thence over path 45 to disk 40 in a usual manner. The reflected laser beam retraces paths 45 and 50; it is partially redirected to path 55 to quad detector 56 for detecting the focus condition and generating a tracking error signal in a usual manner. PREAMP circuit 57 receives the signals from the four electrically independent photo receptors A, B, C, and D of detector 56 for logically combining some to create tracking and focus error signals. PREAMP circuit 57 supplies the FES signal over line 60 to be used by focus servo 49 in maintaining focus of lens 46.

Microprocessor 65 is programmed for controlling the FIG. 4 illustrated optical disk drive. With respect to the focus control, microprocessor 65 actuates initial focus acquire circuit 66 by sending a signal over line 67. Circuit 66 may be that as described and shown in the document incorporated by reference. Initial focus acquire circuit 66 then actuates focus servo 49 by a signal supplied over line 68 to acquire focus in a usual manner. A focus error circuit on line 60 is also supplied to initial focus acquire circuit which indicates when a focus is acquired. When focus is acquired, focus servo 49 maintains the focus of lens 46. Circuit 66 notifies microprocessor 65 by a signal over line 69 when focus has been initially acquired. At this time, microprocessor 65 will then initiated machine-step 11, the circuit the focus acquire circuit 66 having completed the machine step 10.

Sum circuit 70 is electrically interposed between preamplifier (preamp) circuit 57 and focus servo 49 for receiving and FES offset signal from digital to analog converter DAC 71. Microprocessor 65 sets the offset value into register REG 72 which powers DAC 71 to provide the offset signal. In executing machine step 11, microprocessor 65 can select a TES signal supplied from logic circuit 57 to ADC analog to digital converter 73. This is the tracking error TES which is generated from the quad detector 56 using known techniques. The TES signal indicates the relative position of beam 45 to tracks on disk 40 and is supplied to tracking coil 58 to move lens 46 in a cross track direction for controlling cross track position of a beam on path 45. Such tracks are grooved with the grooving generating the tracking error signal through differences in reflection of the light beam travelling through path 45. ADC 73 supplies a digitized indication of the magnitude of TES to microprocessor 65. As an alternative, the amplitude of the data signal readback may be used rather than the TES. In this regard, a portion of the light reflected from disk 40 is redirected by optics 52 along light path 74 to data detector 75 which not only includes photodetectors but also usual signal processing circuits associated with such data detection. The signal output from data detection circuit 75 is supplied to ADC 76 which digitizes the amplitude and supplies the digitized amplitude to microprocessor 65.

Figure 5:
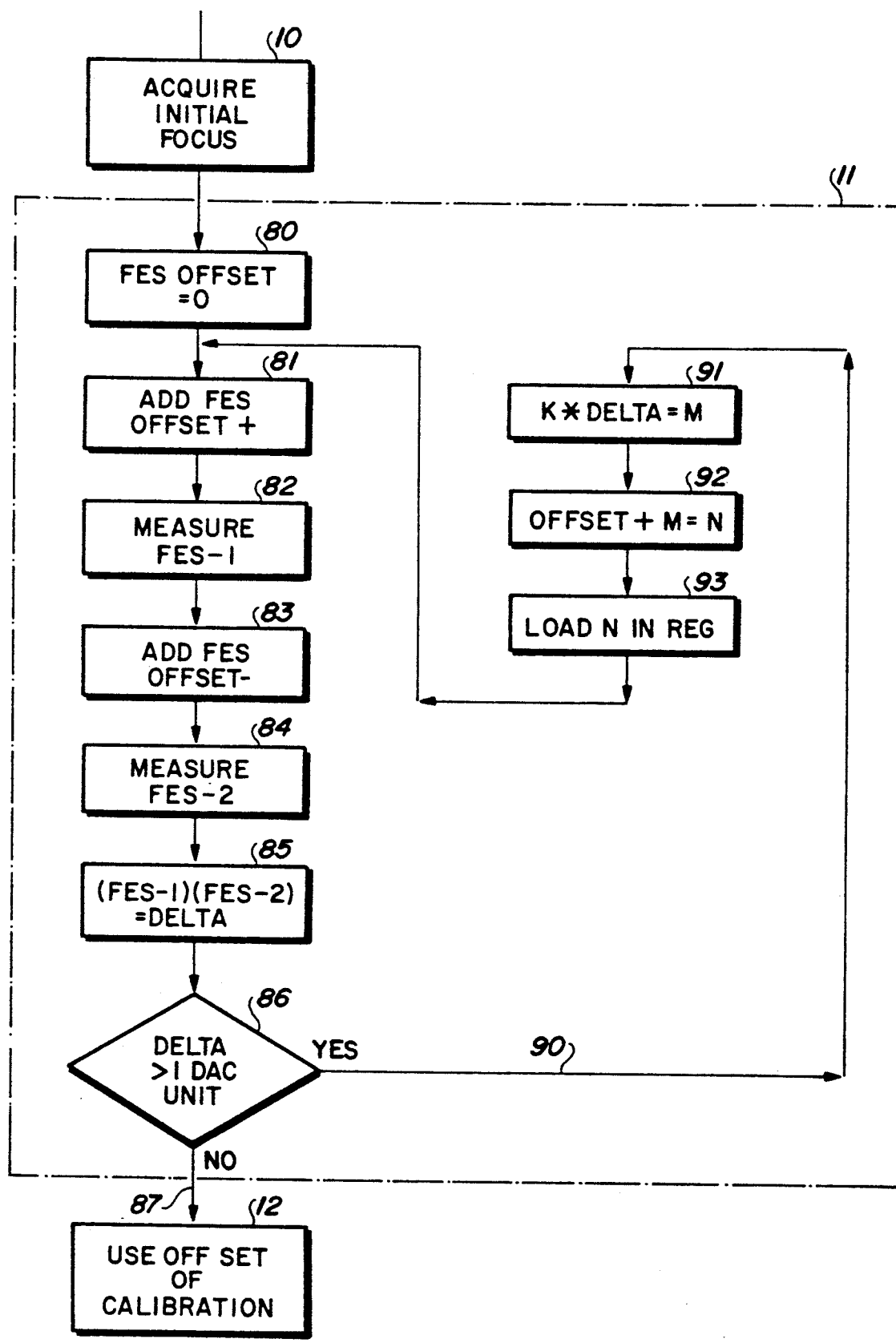
FIG. 5 is a simplified machine-operations chart usable in the FIG. 4 illustrated optical disk recorder for practicing the present invention.

FIG. 5 is an abbreviated machine operations chart showing the operation of the FIG. 4 illustrated device in performing machine step 11 of FIG. 1. FIG. 5 assumes that the initial focus has been acquired by machine step 10. At machine step 80 the FES offset is made equal to zero, i.e., the contents of register 72 are set to a reference value. At machine step 81, the positive FES offset is added to zero which causes a TES readback at point 33 of FIG. 3. At machine step 82 the TES amplitude indicated by ADC 73 is sampled by microprocessor 65, i.e., the FES value 1 has been measured. At machine step 83, the minus offset is added to the initial offset of zero resulting in the TES value 32. At machine step 84, the TES amplitude value at point 32 is measured by microprocessor 65 sampling ADC 73. Then at machine step 85 the two amplitude values 32 and 33 are compared to create a delta value. At machine step 86 the measured delta value is compared with a permitted range of differences such as one change in ADC 76 output. The range of acceptability can be a plurality of ADC 76 increments of digital output signal values. If the delta value is greater than one unit of change in ADC 76 output which is the instance in measuring the values 32 and 33, then a new offset is calculated, steps 81 through 86 are again performed with the positive and negative offsets being added to and subtracted from the new offset value. At machine step 91, the value delta is multiplied by a small constant to generate a modification of the offset M. At machine step 92, the offset value currently used for generating the test points is modified by M (M is assigned quantity) for reaching new value N. At machine step 93 the new value N is loaded into the REG 72. Thereafter, steps 81 through 86 are repeated. Note that in steps 81 and 83 the positive and negative offsets are added to the current offset value.

When at machine step 86 the value delta is within a permitted range, such as represented by points 36 and 37, then program path 87 is followed to machine step 12 which uses the last calculated focus offset as the calibration value to be supplied to register 72 and maintained therein during subsequent operations.

It is to be understood that the data signal supplied through ADC 76 may be used in place of TES. With a grooved media, a TES signal is a little easier to use. When a non-grooved media is used, then some data signal has to be recorded and then the readback data signal is used for the FES calibration.

While the invention has been particularly shown and described with reference to preferred embodiments thereof, it will be understood by those skilled in the art that various changes in form and details may be made therein without departing from the spirit and scope of the invention:

What is claimed is:

1. In apparatus for operating an optical disk drive, including, in combination:

a motor mounting an optical disk for rotation;
 optical means having optical communication with the disk for supplying a laser beam thereto and for receiving a reflection of the laser beam from the optical disk, having focussing means for focussing the laser beam at the disk and having sensing means for sensing the reflected laser beam from the disk and for supplying an electrical signal indicative of the received reflected light;
 offset means connected to the focussing means for altering the focussing of the beam and having an input means for receiving offset values indicating the amount and direction of focussing offset;
 initial focus offset means for generating an initial focus offset value;
 calibration means connected to the initial focus offset means for receiving said initial focus offset value and being connected to said input means of the offset means for supplying said initial focus offset value to the input means and then sequentially and successively adding positive and negative increments to said initial offset values to generate a plurality of successive current focus offset values for actuating said offset means to generate successive focus offsets, measuring means in the calibration means connected to the sensing means for measuring the amplitude of the electrical signal for each of said incremented values, comparing means in the calibration means connected to the measuring means for receiving the two measured values for comparing the two measured values, said comparing means responding to the two measured values having a predetermined difference of less than a predetermined value for indicating to the offset means to use the current offset value as a last current offset value for any ensuing signal processing operations in the optical disk player, said comparing means responding to said two measure values having a difference equal to or greater than said predetermined value for actuating the calibration means to generate a new initial offset value and send the new initial offset value to the offset means for repeating the calibration of the focus offset.

2. In the apparatus set forth in claim 1 further including, in combination:

data means connected to said sensing means for receiving data indicating reflected laser beam from the disk.

3. In the apparatus set forth in claim 1 further including, in combination:

said disk having circumferentially extending grooves signifying signal storing rack locations; and
 tracking means connected to said sensing means for receiving said reflected laser beam from the disk for detecting and indicating relative position of the laser beam and one of the grooves.

4. In the apparatus set forth in claim 1 further including, in combination:
a focus acquire means connected to the optical means for actuating said optical means to acquire a first focus condition which may or may not be a best focus condition; and
means connected to the initial means for setting the initial offset value to a predetermined reference value.

5. In the apparatus as set forth in claim 4 further including in combination:
said sensing means supplying a signal having an amplitude varying with changes in focus offset having a maximum peak value and other peak values and having amplitude reductions at focus offset values greater than the offset focus values that result in said electrical signal having a maximum amplitude, said positive and negative increments producing undesired focus offsets resulting in at least one of the electrical signals received from said sensing means having a reduced amplitude.

6. In the apparatus set forth in claim 1 further including, in combination:
a plurality of machine-sensible track indicators disposed on the disk on a surface facing said optical means;
a tracking error signal generator connected to the sensing means for receiving said electrical signal for generating a tracking error signal for indicating a positional error of said laser beam and one of said track indicators;
said disk having a plurality of data-storing tracks respectively indicated by said track indicators; and
the optics means having means for scanning a one of the tracks using said tracking error signal as an indication for following a track.

7. In a machine-effected method of acquiring focus in an optical system having a focussing element and sensing means connected to the focussing element for receiving light the intensity of which indicates focus and out-of-focus conditions and wherein the light intensity decreases substantially to a minimal intensity during a predetermined maximal one of said out-of-focus conditions and varies in intensity as the out-of-focus conditions less than the predetermined out of focus condition vary, including the machine-executed steps of:
establishing an initial focus condition that is a given focus condition;
positively and negatively changing the given focus condition to two focus conditions such that at least one of the changed focus conditions is beyond the predetermined out-of-focus condition such that the light intensity of the receiving light is reduced; and
comparing the intensities of the received light resulting from the two changed focus conditions, if the compared light intensities are substantially the same, using the given focus condition for operating the optical system, when the signal amplitudes are substantially different, then determining the sign of the difference and changing the given focus condition to reduce the amplitude difference and repeating the changing and comparing steps until the intensities of the received light of the two changed focus conditions have less than a predetermined difference of light intensity.

8. In the machine-effected method set forth in claim 7 further including the machine-executed steps of:
providing focus offset to change the focussing of the focussing element from a focus condition other than the focus condition initially established in said establishing step;
varying the focus offset for obtaining the positive and negative changed focus conditions; and
establishing said established focus condition other than said initial focus condition by varying the focus offset.

* * * * *